Sept. 1, 1959  L. S. KASSEL ET AL  2,902,413
LIQUID-FLUID CONTACTOR
Filed April 20, 1956
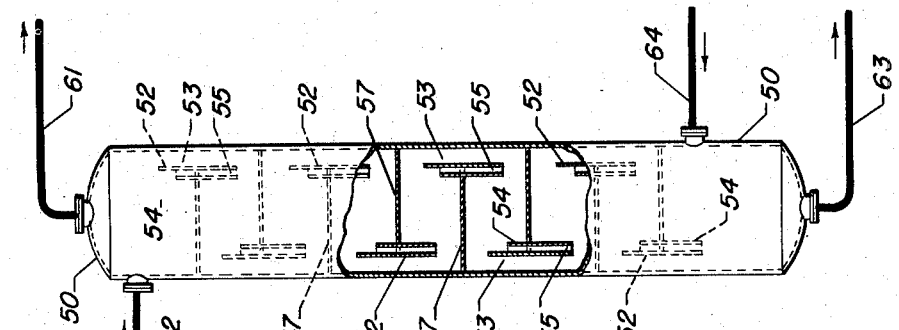
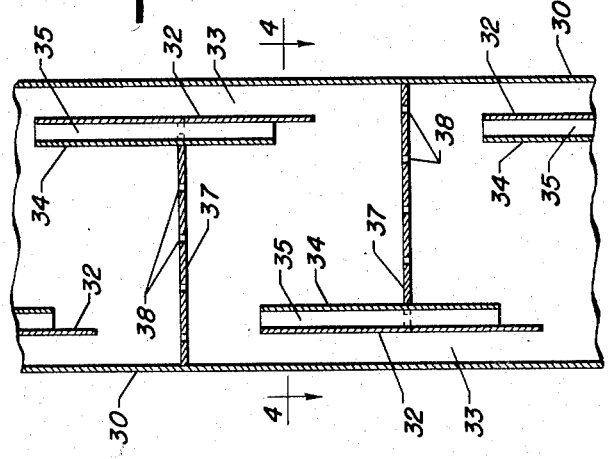
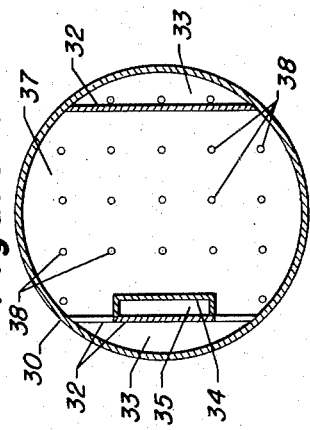
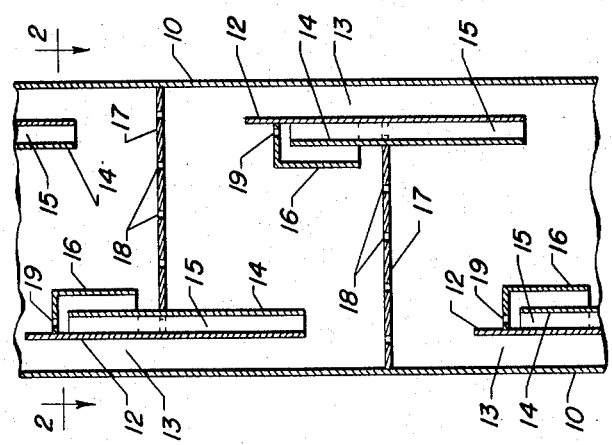
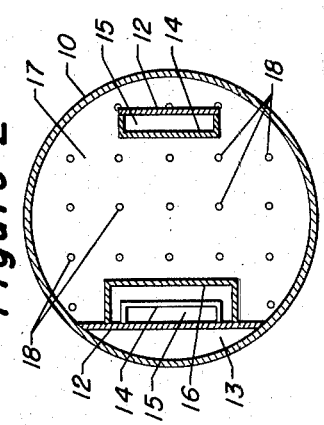
INVENTORS:
Jack B. Pohlenz
Louis S. Kassel
BY:
Chester J. Giuliani
Glen R. Grunewald
ATTORNEYS:

United States Patent Office 2,902,413
Patented Sept. 1, 1959

2,902,413

LIQUID-FLUID CONTACTOR

Louis S. Kassel, Oak Park, and Jack B. Pohlenz, Riverside, Ill., assignors, by mesne assignments, to Universal Oil Products Company, Des Plaines, Ill., a corporation of Delaware Application April 20, 1956, Serial No. 579,625

5 Claims. (Cl. 196—14.52)

This invention relates to a liquid-fluid contacting column and in particular to a unique sieve deck design which is especially useful in multi-stage liquid-fluid contactors.

Liquid-fluid contacts of two general classes are frequently desirable. These general classes are contacting a liquid with another liquid which is at least partially immiscible therewith and contacting a liquid with a gas. This invention broadly relates to both types, but finds particular utility in contacting liquids with other immiscible liquids and the discussion of this invention will be largely limited thereto. It is to be understood that in describing this invention in relation to liquid-liquid contacts it is not intended to remove liquid-gas contacts from its broad scope.

Continuous multi-stage countercurrent liquid-liquid contacts are usually effected in a series of stages which are vertically disposed in a common shell. Each stage is contained between two perforated plates or their equivalent and each plate contains conduit means passing from above to beneath and extending beyond the plate in one direction. In all such contacts one phase must be more dense than the other and substantially immiscible therewith. The contact is effected by causing one phase to flow in a generally upward direction through the column while the other phase flows in a generally downward direction through the column with one of said phases being discontinuous and the other continuous. The continuous phase flows laterally across each stage and then through the before-mentioned conduit into the next successive stage while the discontinuous phase is broken into subdivided particles or droplets by passing through the perforations in each horizontal plate and the droplets pass through the laterally moving continuous phase in each stage and reaccumulate in that stage as a pool adjacent the perforated plate. Either the more dense or the less dense phase may be continuous. For example, when the conduit members passing through each plate extend upwardly from each plate the more dense phase is discontinuous raining down through the perforations in the plate through the less dense phase immediately beneath. Conversely, when the conduits extend below each plate the less dense phase is discontinuous and passes upwardly as droplets through the more dense phase.

Regardless of which phase is continuous and which is discontinuous, the limit of operability of a column is established by the open area in each perforated plate. The rate of fluid flow through a perforated plate is proportional to the open area of the perforations, the head of liquid on each plate and the general flow characteristics of the liquid. For any given liquid, therefore, and for any given plate the flow rate can be increased only by varying the level of the interface in each stage, however, the height of each stage limits how much head can be obtained. Another limitation on the amount of head may be the characteristics of the fluids in contact. For example, when the fluids in contact with each other tend to form stable dispersions the increased turbulence caused by high velocity flow through the perforations may cause a stable dispersion to form. In mild cases, the formation of a too stable dispersion will cause entrainment of the continuous in the discontinuous phase which results in recirculating of one phase thereby destroying the countercurrent flow and unnecessarily loading the column with internal circulation. In extreme cases, the formation of dispersions will completely destroy the contact of one phase with another since the entire column may fill with dispersion which cannot be identified with either phase.

In many operations a number of equilibrium contacting stages are required in order for a certain effect to be obtained. For example, in a liquid-liquid extraction processes the equilibrium conditions in the stage are what determine the number of stages required. In many such processes equilibrium is readily obtained so that high tray efficiency is not a necessary requirement and in such processes high throughputs and flexibility of operation are of importance.

This invention provides a novel tray assembly which increases the flexibility of a contacting column. The tray assembly of this invention establishes a maximum position of an interface between phases so that extremely high velocity flow may not be effected through the perforated plate and furthermore provides a means by which throughput may be purchased at the expense of stage efficiency. The tray assembly of this invention also provides a contacting stage which readily adapts itself to temporary upsets and easily accommodates severe conditions which may be of short or relatively long duration.

The general construction and operation of the tray assembly of this invention may best be described with reference to the accompanying drawings which illustrate in Figures 1 and 2 a sectional elevation and sectional plan view respectively of an embodiment of this invention suitable for a liquid-liquid contact in which the more dense phase is discontinuous. Figures 3 and 4 illustrate a sectional elevation and sectional plan view respectively of an embodiment of this invention wherein the less dense phase is discontinuous. Figure 5 illustrates a multi-stage contacting column employing sieve deck assemblies as illustrated in Figures 1 and 2.

Referring to Figures 1 and 2 in which the same numbers indicate the same parts, there is shown a cylindrical shell 10 containing plates 17 which contain perforations 18. Each perforated plate has passing therethrough a partition 12 which is sealed against the wall of shell 10 to form a passageway 13 passing from immediately below perforated plate 17 to a point somewhat above it. A second partition 14 connects to partition 12 and extends somewhat below perforated plate 17 forming another channel 15 which passes from a point below the upper extremity of channel 13 to a point somewhat below perforated plate 17. In this embodiment, still another partition 16 connects to partition 12 in a manner to form a hood over the upper portion of channel 15. Having described the shape of the elements a brief description of their functions follows.

As hereinbefore stated, the embodiments of Figures 1 and 2 illustrate the tray assemblies of this invention adapted to provide for a discontinuous more-dense phase. The more-dense phase will be introduced as droplets into each contacting zone and will rain down through the continuous less-dense phase reaccumulating above each plate 17 to be redispersed through perforations 18. The less-dense phase rises through the column by passing up passageways 13 into the upper portion of each contacting stage and then laterally across the stage into the next superjacent passageway 13.

When a more rapid flow rate is desired through the perforations, the elevation of the interface between phases in each stage may be raised. This, of course, increases the head of fluid driving the discontinuous phase through the perforations and results in a faster flow rate. It is, however, not desirable for the entire stage to fill with more-dense fluid and so the upper extremity of passageway 15 provides an overflow for more-dense phase so that it can pass from one stage to the next subjacent stage without being dispersed through perforations 18. This limits the maximum height of the interface in each stage and furthermore allows for passing more material through the column than would be possible through the perforations alone. In this embodiment, the hood member 16 provides a skimming baffle which prevents any foamy dispersion at the interface from entering passageway 15 and thereby provides for only clear more-dense phase to pass through passageway 15 into the next lower contacting stage. From the foregoing discussion, it may be seen that when it is desired to operate at greater throughputs of more-dense phase, even at a sacrifice of stage efficiency, the tray assembly of the present invention provides a means for by-passing the excess more-dense phase around each peforated plate. A vent hole 19 will be required in each hood member 16 to prevent siphoning.

As hereinbefore stated, the embodiment of this invention shown in Figures 3 and 4 represents the use of this invention in a column wherein the less-dense phase is dispersed. In this embodiment the material by-passing each perforated plate is taken from the interface as will be hereinafter shown. As in the previous description the more-dense phase is introduced into the upper portion of each stage and the less-dense phase into the lower portion, however, in this embodiment the less-dense phase is introduced into each stage in subdivided form by passing through perforations 38 contained in plate 37. As in the previous embodiment, a partition 32 is sealed against outer shell 30 to form a passageway 33 extending through plate 37 and downwardly into the next lower contacting stage. A second partition 34 connects with partition 32 to form channel 35 which opens beneath perforated plate 37 a lesser distance than channel 33 does and is arranged to conduct less-dense phase from beneath plate 37 to a point somewhat above it. Similar to the embodiments of Figures 1 and 2, when an interface between phases is too far below perforated plate 37 the excess will pass through channel 35 into the next superjacent contacting stage without passing through perforations 38. In this embodiment, the flow rate of less-dense phase may be independent of the open area of perforated plate 37 so that throughput may be purchased at the expense of efficiency or so that upsets of varying duration may be readily accommodated by simply losing an increment of efficiency, however, continuing operations undisturbed.

Figure 5 illustrates a contacting column containing several contacting stages as descibed in Figures 1 and 2. Outer shell 50 contains a series of perforated plates 57 and each contacting stage is connected to its adjacent contacting stage through passageway 53 formed by partition 52 sealed against outer shell 50. A second passageway 55 is formed by partition 54 connecting to partition 52 and the passageway 54 extends from a lesser distance above each perforated plate 57 than passageway 53 to a position somewhat below each plate. The column of Figure 5 is provided with upper inlet 62 for more dense phase and lower outlet 63 for more dense phase as well as lower inlet 64 for less dense phase and upper outlet 61 for less dense phase. This arrangement illustrates a simple and typical arrangement of trays and conduits, however, it is not intended to limit the invention to this particular arrangement. Therefore, the column may be provided with additional feed, auxiliary withdrawal streams for sidecuts and additional inlet streams for reflux or feeds having different composition and others.

Other modifications of this invention include the use of tubular conduits interconnecting the various stages which may be spaced diametrically opposed or at 90° or at other intervals around the periphery of the column. The conduits interconnecting the various contacting stages may be disposed centrally and may consist of one or many in number. Also, various instrumentation and control devices may be employed in their conventional manner without removing the modified device from the broad scope of this invention.

A specific embodiment of the use of the liquid-fluid contactor of this invention is its use in a liquid-liquid extraction process. A typical process, and one frequently employed, is the removal of aromatic hydrocarbons from a mixture of hydrocarbons by extracting the aromatic hydrocarbons in an aqueous selective solvent. In such a process, the more dense phase is an aqueous phase containing a solvent, preferably diethylene glycol. The selectivity of the solvent may be adjusted by increasing or decreasing its water content and when the selectivity is increased by adding greater quantities of water, the ability of the solvent to dissolve is reduced so that greater throughputs of solvent are required to dissolve the same amount of material, however, a greater purity of product may be obtained with the same number of contacting stages and other operational variables constant.

Applying this process to the column illustrated in Figure 5, an aromatic hydrocarbon-containing fraction, preferably petroleum, boiling in the gasoline range or higher is introduced through line 64 into the lower section of column 50 and rises from stage to stage as the continuous phase. The aqueous glycol stream which contains from about 5% to about 25% by volume of water and which is the more-dense phase is in this case the discontinuous phase and is introduced through line 62 into the upper portion of column 50. The liquid-liquid extraction is preferably effected at an elevated temperature, in the range of about 250° F. and higher, to increase the solubility of the aromatic hydrocarbons in the solvent and thereby provide greater removal of solute per unit volume of solvent. Sufficient pressure must be maintained on the system to keep all material in the liquid phase. A raffinate phase containing substantially pure aliphatic hydrocarbons is ultimately discharged through line 61 and a rich solvent phase containing the dissolved aromatic hydrocarbons is discharged through line 63. The rich solvent phase at high temperature and whatever pressure is required to maintain it liquid is passed to a stripping zone wherein the hydrocarbon, which is substantially pure aromatic hydrocarbon, is separated from the solvent by distillation, dilution, cooling or other well known means. The recovered selective solvent is then reheated, reconstituted or otherwise put back into condition for maximum utilization and returned to line 62 in the upper portion of shell 50.

Although not shown, it is preferred that the process be operated with a reflux stream introduced into the bottom stage of the column to improve the quantity or purity of the aromatic hydrocarbon product which is ultimately recovered. This reflux stream may comprise aromatic hydrocarbons which are a portion of the product or in one embodiment it may comprise low boiling aliphatic hydrocarbons which are readily separable from the aromatic product by distillation.

The charge stock to the process, as hereinbefore stated, may be a petroleum fraction and is preferably a petroleum fraction which has been enriched in aromatic hydrocarbons by such processes as dehydrogenation of naphthenic hydrocarbons or in processes effected on gasoline and naphtha which are generally known as reforming. The charge stock may, however, result from destructive hydrogenation or destructive distillation of

We claim as our invention:

1. A sieve deck assembly for contacting continuous and discontinuous fluid phases which comprises a horizontal perforated plate in contact on one side with continuous phase and on the other side with discontinuous phase, first vertical conduit means extending above and below said plate and through said discontinuous phase, and second vertical conduit means extending above and below said plate and terminating a lesser distance from said plate than said first conduit means on the side of said plate in contact with said discontinuous fluid.

2. A sieve deck assembly for contacting continuous and discontinuous fluid phases which comprises a horizontal perforated plate in contact on its upper side with continuous phase and on its opposite side with discontinuous phase, first vertical conduit means extending above and below said plate and through said discontinuous phase, and second vertical conduit means extending above and below said plate and terminating a lesser distance above said plate than said first conduit means.

3. A sieve deck assembly for contacting continuous and discontinuous fluid phases which comprises a horizontal perforated plate in contact on its upper side with continuous phase and on its opposite side with discontinuous phase, first vertical conduit means extending above and below said plate and through said discontinuous phase, second vertical conduit means extending above and below said plate and terminating a lesser distance above said plate than said first conduit means, and a vented hood member disposed over and extending downwardly below the upper end of said second conduit means and terminating short of said plate.

4. A sieve deck assembly comprising a horizontal perforated plate, first vertical conduit means extending above and below said plate, second vertical conduit means adjacent said first conduit means and extending above and below said plate and terminating at a point a lesser distance above the plate than the first conduit means, and a hood member disposed over and extending downwardly below the upper end of said second conduit means and terminating short of said plate, said hood member having a vent hole in its top portion.

5. In a fluid contacting column having a horizontal perforated plate, the combination of a first vertical partition extending above and below said plate and forming a fluid passageway with a wall of said column, a second vertical partition extending above and below said plate and forming a second fluid passageway with said first partition, the latter extending a greater distance above said plate than the second partition, and a hood member attached to said first partition above said plate and having a vented top portion above the upper end of said second passageway and vertical portion spaced from the second partition and terminating short of said plate.

References Cited in the file of this patent
UNITED STATES PATENTS

| | | |
|---|---|---|
| 2,520,391 | Findlay | Aug. 29, 1950 |
| 2,528,426 | Davis et al. | Oct. 31, 1950 |
| 2,609,276 | Casler et al. | Sept. 2, 1952 |
| 2,647,855 | Grunewald | Aug. 4, 1953 |
| 2,682,395 | Claridge et al. | June 29, 1954 |
| 2,838,383 | Wistrich | June 10, 1958 |